US012179667B2

(12) United States Patent
Kawanishi et al.

(10) Patent No.: US 12,179,667 B2
(45) Date of Patent: Dec. 31, 2024

(54) BASE ASSEMBLY, AND PERIPHERY MONITORING DEVICE FOR VEHICLE

(71) Applicant: Misato Industries Co., Ltd., Fujioka (JP)

(72) Inventors: Joichi Kawanishi, Isehara (JP); Ryosuke Iba, Isehara (JP)

(73) Assignee: Misato Industries Co., Ltd., Fujioka (JP)

( * ) Notice: Subject to any disclaimer, the term of this patent is extended or adjusted under 35 U.S.C. 154(b) by 301 days.

(21) Appl. No.: 17/758,001

(22) PCT Filed: Dec. 23, 2020

(86) PCT No.: PCT/JP2020/048119

§ 371 (c)(1),
(2) Date: Jun. 24, 2022

(87) PCT Pub. No.: WO2021/132313

PCT Pub. Date: Jul. 1, 2021

(65) Prior Publication Data

US 2023/0331154 A1 Oct. 19, 2023

(30) Foreign Application Priority Data

Dec. 26, 2019 (JP) ................................ 2019-236710

(51) Int. Cl.
*B60R 1/06* (2006.01)
*B60J 5/04* (2006.01)

(52) U.S. Cl.
CPC ............... *B60R 1/06* (2013.01); *B60J 5/0404* (2013.01)

(58) Field of Classification Search
CPC ................................ B60J 5/0404; B60R 1/06
(Continued)

(56) References Cited

U.S. PATENT DOCUMENTS 11,167,694 B2 * 11/2021 Suto .......................... B60R 1/06
11,505,125 B2 * 11/2022 Caraan ...................... B60R 1/06
(Continued)

FOREIGN PATENT DOCUMENTS

JP 2013123929 A * 6/2013
JP 2015-024755 A 2/2015
JP 2015229487 A * 12/2015

OTHER PUBLICATIONS

Machine Translation of JP2013123929 (Year: 2024).*
(Continued)

*Primary Examiner* — Jason S Morrow
(74) *Attorney, Agent, or Firm* — Oblon, McClelland, Maier & Neustadt, L.L.P.

(57) ABSTRACT

A base assembly, capable of restricting an edge part of a cover from moving, includes: a base, a gasket and a cover, in which the base includes a fixing part and an attaching part, the gasket is attached to the fixing part, the cover is attached at the fixing part and the attaching part, and a lower edge part of the cover facing lower edge parts of the fixing part and the gasket has a vertical edge part, the lower edge part of the gasket has a horizontal edge part, stopper parts to restrict the vertical edge part from moving with respect to the lower edge part of the base are provided at the base and the cover, respectively, and the stopper part on the base's side is provided vertically, and the stopper part on the cover's side is provided horizontally.

7 Claims, 8 Drawing Sheets

(58) Field of Classification Search
USPC .......................................................... 296/1.11
See application file for complete search history.

(56) References Cited

U.S. PATENT DOCUMENTS

| | | | | |
|---|---|---|---|---|
| 11,951,908 | B2 * | 4/2024 | Bhaskar .................. | F21S 43/27 |
| 2011/0194201 | A1 * | 8/2011 | Muramatsu ............ | B60J 5/0404<br>359/871 |
| 2023/0017426 | A1 * | 1/2023 | Scott-Collins ............ | B60S 1/56 |
| 2023/0264629 | A1 * | 8/2023 | Matsubara .............. | B60R 13/07<br>359/871 |

OTHER PUBLICATIONS

Machine Translation of JP2015229487 (Year: 2024).*
International Search Report mailed on Mar. 9, 2021 in PCT/JP2020/048119 filed on Dec. 23, 2020.

* cited by examiner

BASE ASSEMBLY, AND PERIPHERY MONITORING DEVICE FOR VEHICLE

TECHNICAL FIELD

The present invention relates to a base assembly configuring a periphery monitoring device for a vehicle. The present invention also relates to a periphery monitoring device for a vehicle with a base assembly.

BACKGROUND ART

Conventionally, there has been a base assembly configuring a periphery monitoring device for a vehicle, or a periphery monitoring device for a vehicle with such a base assembly (see Patent Literature 1, for example). Briefly explained below is an outside mirror device for a vehicle disclosed in the Patent Literature 1.

The outside mirror device for a vehicle disclosed in the Patent Literature 1 includes a base assembly and a mirror assembly. The base assembly comprises base, gasket, and cover. Each of the base and the cover has a mating part and an elastic mating claw part. Each of the base and the gasket has a mating pin and a mating hole. The gasket has a press part. The outside mirror device for a vehicle disclosed in the Patent Literature 1 is capable of assembling the base, the gasket, and the cover integrally without screws.

CITATION LIST

Patent Literature

Patent Literature 1: Japanese Patent Laid-Open Publication No. 2015-24755

SUMMARY OF THE INVENTION

Problems to be Solved by the Invention

In a base assembly and a periphery monitoring device for a vehicle, especially it is important to restrict an edge of a cover from moving with respect to the base. Namely, if the edge of the cover moves with respect to the base, an appearance is spoiled. Accordingly, it is important to restrict the edge of the cover from moving with respect to the base.

The problem to be solved by the present invention is to provide a base assembly and a periphery monitoring device for a vehicle, which is capable of restricting the edge of the cover from moving with respect to the base.

Means for Solving the Problem

A base assembly according to the present invention includes: a base; a gasket; and a cover, in which the base includes a fixing part to be fixed to a vehicle body and an attaching part, an upward portion of the attaching part being attached to a monitoring assembly, the gasket is attached to the fixing part to exist between the fixing part and the vehicle body, the cover is attached at a downward portion of the fixing part and at a downward portion of the attaching part to cover the downward portion of the fixing part and the downward portion of the attaching part, and an edge part among edge parts of the cover that faces an edge part at the downward portion of the fixing part and an edge part at the downward portion of the gasket has a vertical edge part that is provided in a vertical direction, the edge part at the downward portion of the gasket has a horizontal edge part provided in a horizontal direction from the edge part at the downward portion of the base toward the vertical edge part's side of the gasket, a plurality of stopper parts to restrict the vertical edge part from moving with respect to the edge part at the downward portion of the base by action of the horizontal edge part are provided at the edge part at the downward portion of the base and at the vertical edge part at the downward portion of the cover, respectively, and the stopper part on the base's side is provided in a vertical direction, and the stopper part on the cover's side is provided in a horizontal direction.

In the base assembly according to the present invention, it is preferred that the cover is provided continuously at the vertical edge part and has a concave part that is concaved from the vertical edge part's side to the downward portion of the base and to the downward portion of the gasket.

In the base assembly according to the present invention, it is preferred that the stopper part on the cover's side has a plate part provided in a horizontal direction and an abutting edge part provided at an edge of an opening provided in the plate part, the stopper part on the base's side has an abutting protrusion part provided in a vertical direction, the abutting edge part and the abutting protrusion part are abutted to each other to restrict the vertical edge part from moving in a direction away from the edge part at the downward portion of the base by action of the horizontal edge part.

In the base assembly according to the present invention, it is preferred that the stopper part on the cover's side has an additional plate part provided in a horizontal direction adjacent to the plate part and an additional abutting edge part provided in the additional plate part, the stopper part on the base's side has an additional abutting protrusion part provided in a vertical direction adjacent to the abutting protrusion part, and the additional abutting edge part and the additional abutting protrusion part are abutted to each other to restrict the vertical edge part from moving in a direction close to the edge part at the downward portion of the base.

In the base assembly according to the present invention, it is preferred that the stopper part on the cover's side has a plate part provided in a horizontal direction and an abutting edge part provided in the plate part, the stopper part on the base's side has an abutting protrusion part provided in a vertical direction, the abutting edge part and the abutting protrusion part are abutted to each other to restrict the vertical edge part from moving in a direction away from the edge part at the downward portion of the base by action of the horizontal edge part.

In the base assembly according to the present invention, it is preferred that the stopper part on the cover's side has an additional abutting edge part provided in the plate part adjacent to the abutting edge part, the stopper part on the base's side has an additional abutting protrusion part provided in a vertical direction adjacent to the abutting protrusion part, and the additional abutting edge part and the additional abutting protrusion part are abutted to each other to restrict the vertical edge part from moving in a direction close to the edge part at the downward portion of the base.

A periphery monitoring device for a vehicle according to the present invention includes the base assembly fixed to the vehicle body and a monitoring assembly attached to the base assembly.

Effect of the Invention

The base assembly and the periphery monitoring device for a vehicle according to the present invention can restrict the edge part of the cover from moving with respect to the base.

MODE FOR CARRYING OUT THE INVENTION

Now, a base assembly and a periphery monitoring device for a vehicle according to an embodiment of the present invention is described below in detail with reference to drawings. It should be noted that as the drawings are schematically illustrated, main components are illustrated, components other than the main components are omitted, and hatching or cross section would be partially omitted from the drawings.

Figure 1:
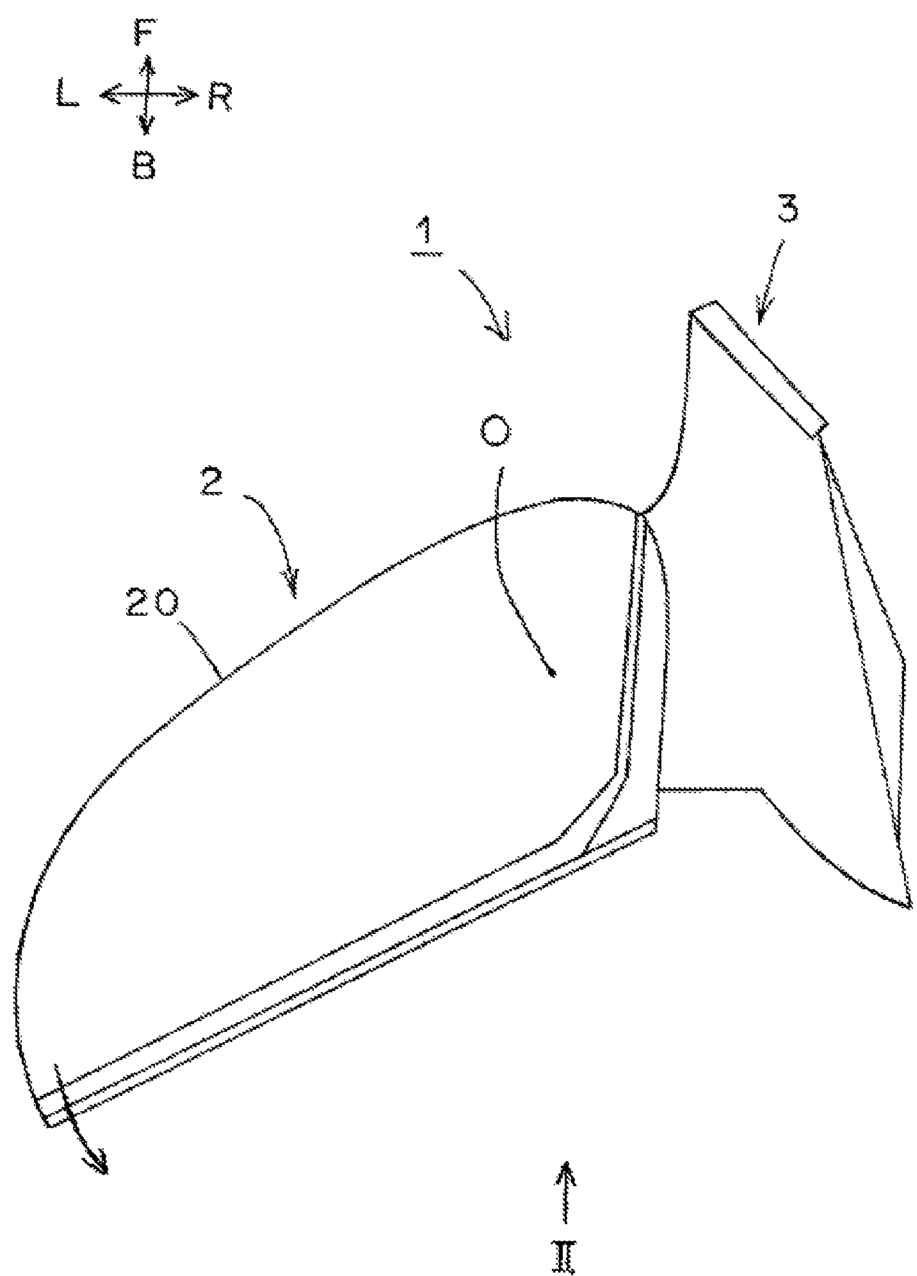
FIG. 1 is a plan view of an outside mirror device for a vehicle illustrating an embodiment of a base assembly and a periphery monitoring device for a vehicle of the present invention.
Figure 2:
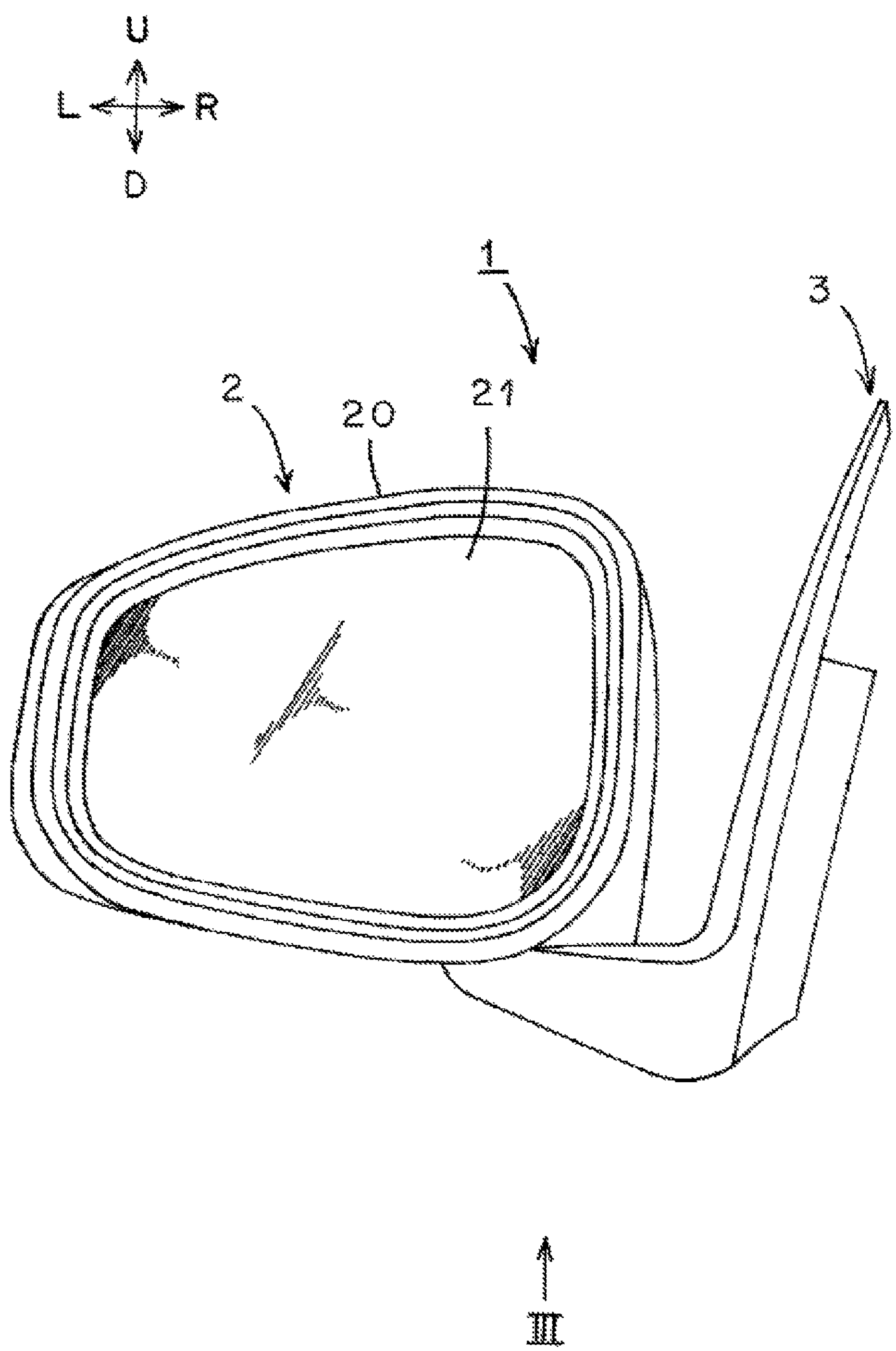
FIG. 2 is a front view illustrating the outside mirror device for a vehicle, which is viewed along a direction of an arrow II in FIG. 1.
Figure 3:
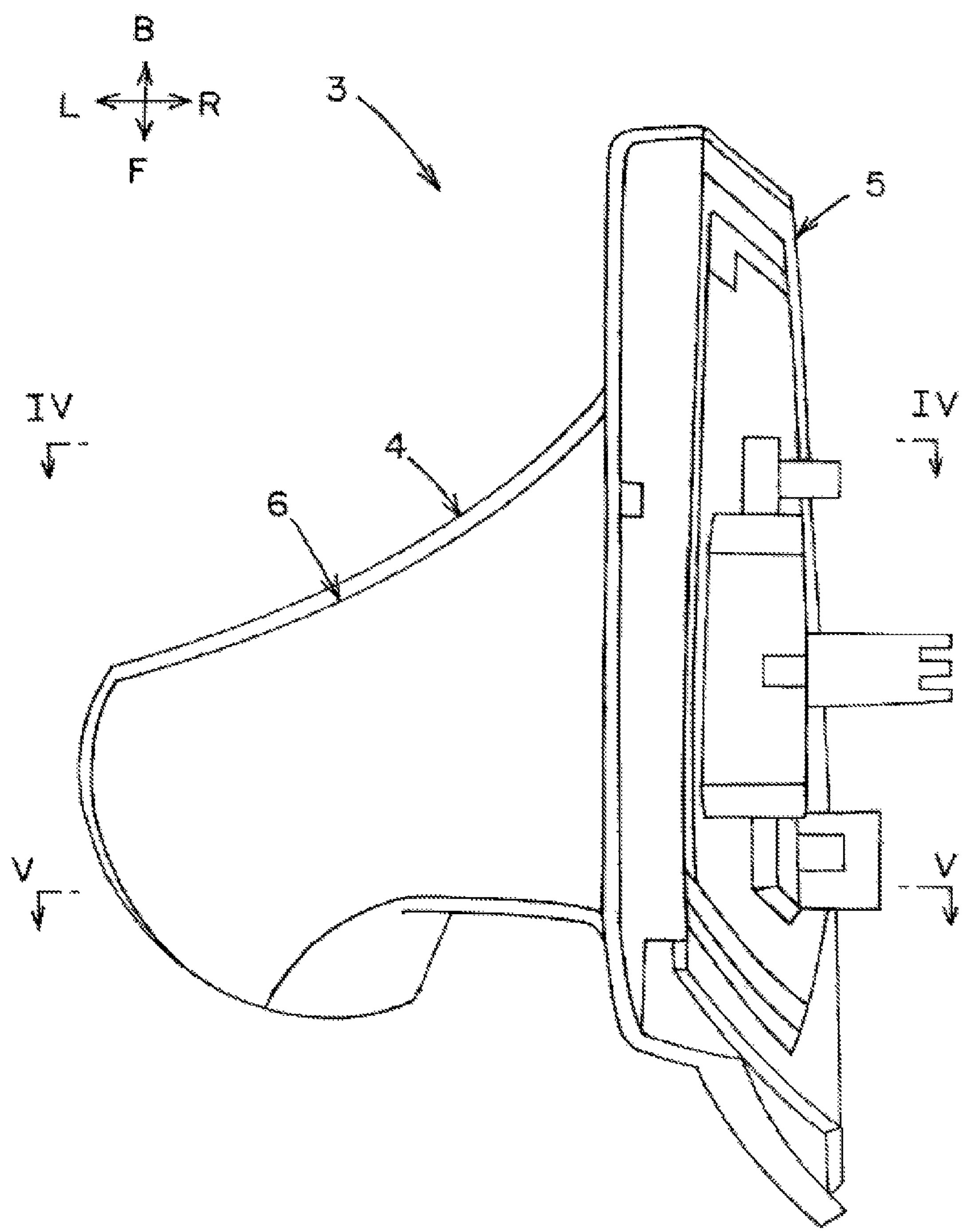
FIG. 3 is a bottom view of the base assembly, which is viewed along a direction of an arrow III in FIG. 2.

In this specification, front, back, up, down, left, and right direction respectively correspond to front, back, up, down, left, and right direction when a vehicle is equipped with the periphery monitoring device for a vehicle according to the present invention. In FIG. 1 through 3, the reference symbols “F”, “B”, “U”, “D”, “L”, and “R” express “front”, “back”, “up”, “down”, “left”, and “right”, respectively.

EXPLANATION OF CONFIGURATION OF EMBODIMENT

The configuration of each of the base assembly and the periphery monitoring device for a vehicle according to the embodiment is described below. In FIGS. 1 and 2, reference numeral 1 denotes the periphery monitoring device for a vehicle according to the embodiment.

Description of Periphery Monitoring Device for a Vehicle 1

In the embodiment, the periphery monitoring device for a vehicle 1 is, for example, an outside mirror device for a vehicle as a door mirror for a vehicle, which is hereinafter simply referred to as “door mirror 1.” The door mirrors 1 are equipped with a vehicle on its left and right doors, respectively, (see an outer panel 10 of a vehicle body in FIGS. 6 and 7).

The door mirror 1 equipped on the left side door is described below. Here, in the door mirror 1 equipped on the left side door, the left side is defined as the outside of the vehicle, while the right side is defined as the inside of the vehicle. The door mirrors 1 equipped on the right side and the left side doors are of substantially symmetrical shape. Accordingly, description of the door mirror equipped on the right side door is omitted.

The door mirror 1 has monitoring assembly 2 and base assembly 3, as shown in FIGS. 1 and 2. The base assembly 3 is fixed to the door. The monitoring assembly 2 is attached to the base assembly 3 with being rotatably around a rotation center axis line O.

Description of Monitoring Assembly 2

As shown in FIGS. 1 and 2, the monitoring assembly 2 has housing 20, monitoring unit 21, and electric holding unit (not shown). The monitoring assembly 2 may have a side turn signal lamp as a vehicle light on the housing 20.

The housing 20 is in a hollow box shape and is opened at the front side (back side of the vehicle).

in this example, the monitoring unit 21 is a mirror and is installed in opening portion of the housing 20. The monitoring unit 21 is attached to the housing 20 through a driving mechanism (power unit). A mirror surface of the monitoring unit 21 is, by the driving mechanism, rotatable around a vertical axis in a left-right direction as well as rotatable around a horizontal axis in an up-down direction, and is adjustable.

The monitoring unit may be a camera in place of the mirror in this example. In the case where the monitoring unit is a camera, dimension of the housing 20 can be much reduced in the up-down direction. Information about a periphery of the vehicle captured by the camera can be displayed on a display device (not shown) built in the interior of the vehicle via an image processing unit or the like (not shown).

The electric holding unit causes the monitoring assembly 2 to rotationally move between a use position (shown in FIGS. 1 and 2) and a back holding position (not shown) with electric power (see solid arrow in FIG. 1).

The electric holding unit is composed of shaft, motor, reduction gear, and clutch mechanism. Most of the parts of the electric holding unit is accommodated in the housing 20 and attached thereto. A longitudinal center axis line of the shaft aligns with the rotation center axis line O of the monitoring assembly 2.

Description of Base Assembly 3

As shown in FIG. 3, the base assembly 3 has base 4, gasket 5, and cover 6 (also referred to as base undercover). The base assembly 3 is fixed to the outer panel 10 with fixing means (not shown). Screws or the like are used as the fixing means as appropriate.

Description of Base 4

Figure 4:
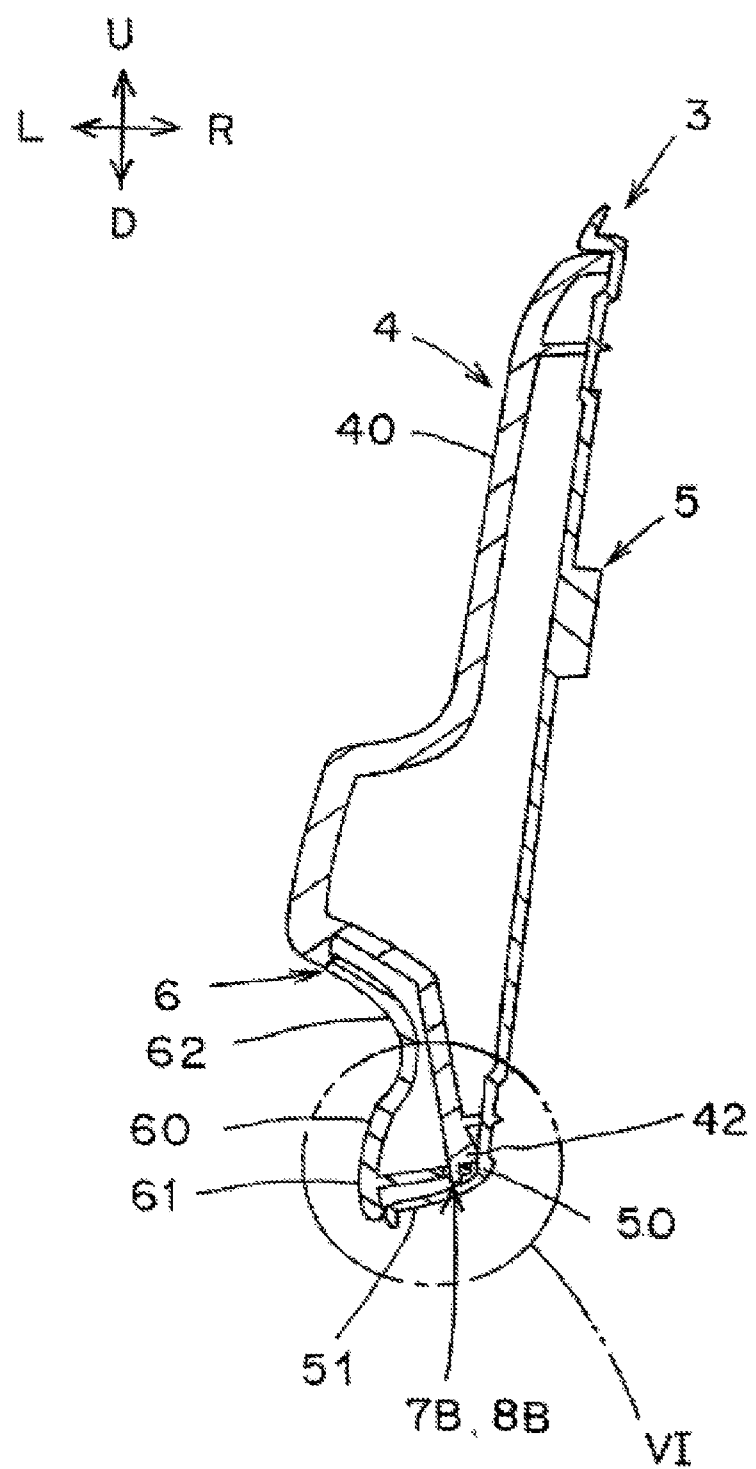
FIG. 4 is a cross-sectional view of the base assembly, which is taken along line IV-IV in FIG. 3.
Figure 5:
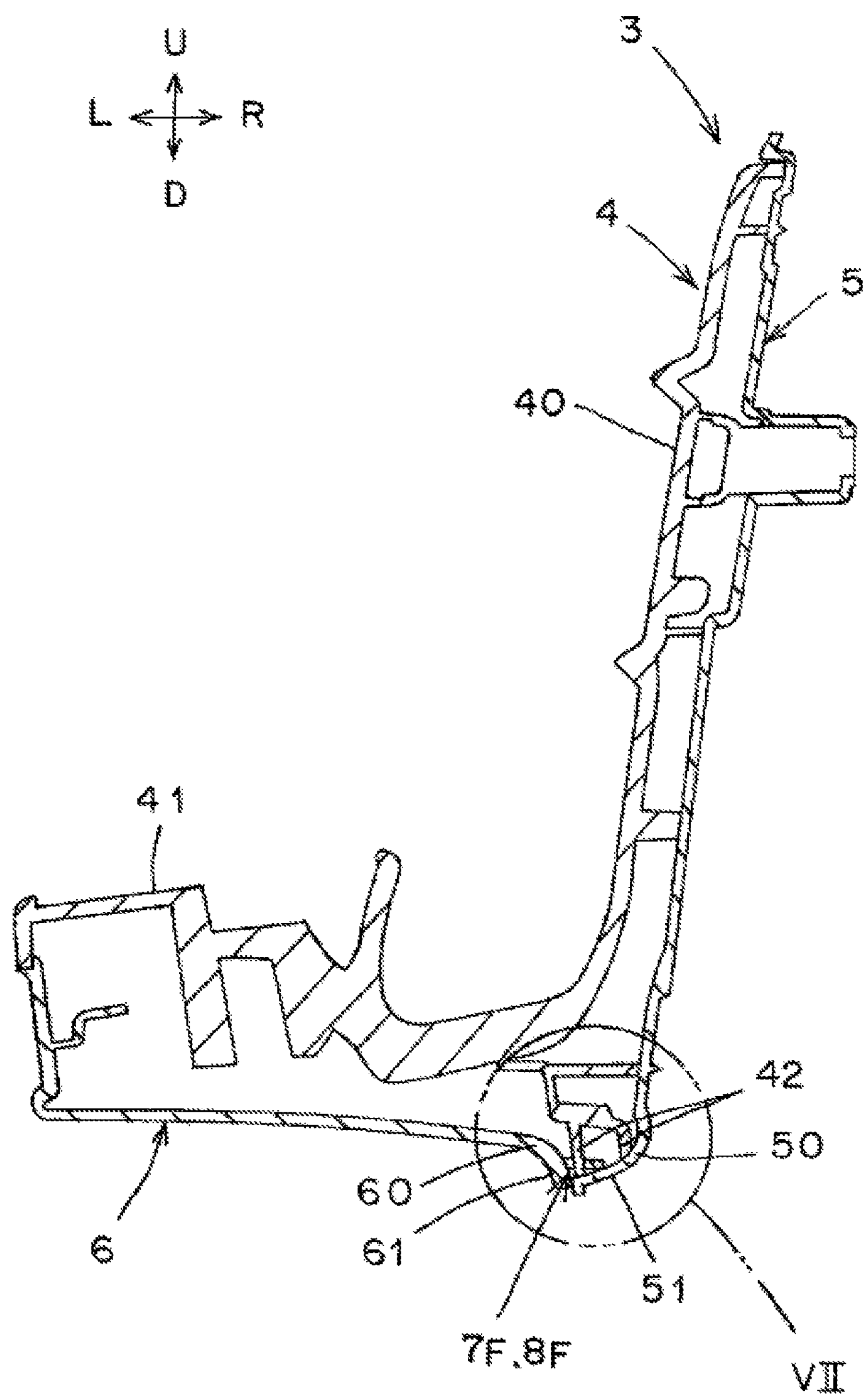
FIG. 5 is a cross-sectional view of the base assembly, which is taken along line V-V in FIG. 3.

In this example, the base 4 is manufactured by die-cast, highly rigid resin, or the like. As shown in FIGS. 4 and 5, the base 4 has fixing part 40 and attaching part 41.

The fixing part 40 and the attaching part 41 are configured integrally. Namely, downward portion of the fixing part 40 is connected to a right end portion of the attaching part 41 integrally.

The fixing part 40 is provided along a substantially vertical direction. The fixing part 40 is fixed to the outer panel 10. The fixing part 40 has a peripheral edge part 42.

The attaching part 41 is provided along a substantially horizontal direction. The monitoring assembly 2 is attached on an upward portion of the attaching part 41.

Description of Gasket 5

In this example, the gasket 5 is made of PE (polyethylene), EPDM (ethylene propylene rubber), POM (polyacetal, acetal resin), TEO (thermoplastic elastomer), etc. Namely, the gasket 5 is made of resin-based or rubber-based flexible elastic material.

As shown in FIGS. 3 through 7, the gasket 5 is attached to the fixing part 40 of the base 4 with attachment means (not shown) to exist between the fixing part 40 and the outer panel 10. Means such as mating means or elastic mating means can be employed as the attachment means as appropriate.

The peripheral edge part of the gasket 5 has an edge part 50. As shown in FIGS. 6 and 7, the edge part 50 at the downward portion of the gasket 5 has a horizontal edge part 51 provided in a horizontal direction from the edge part 42 at the downward portion of the base 4 toward a vertical edge part 61 of the cover 6.

Description of Cover 6

In this example, the cover 6 is composed of molded resin. As shown in FIGS. 3 through 10, the cover 6 is attached to a downward portion of the fixing part 40 of the base 4 and a downward portion of the attaching part 41 with an attachment means (not shown) to cover the downward portion of the fixing part 40 and the downward portion of the attaching part 41. Means such as mating means or elastic mating means can be employed as the attachment means as appropriate.

The cover 6 has a peripheral edge part 60. As shown in FIGS. 4 through 7, 9 and 10, the edge part 60 among edge parts 60 of the cover 6, which faces the edge part 42 at the downward portion of the fixing part 40 of the base 4 as well as the edge part 50 at the downward portion of the gasket 5, has a vertical edge part 61 provided in a vertical direction.

Figure 6:
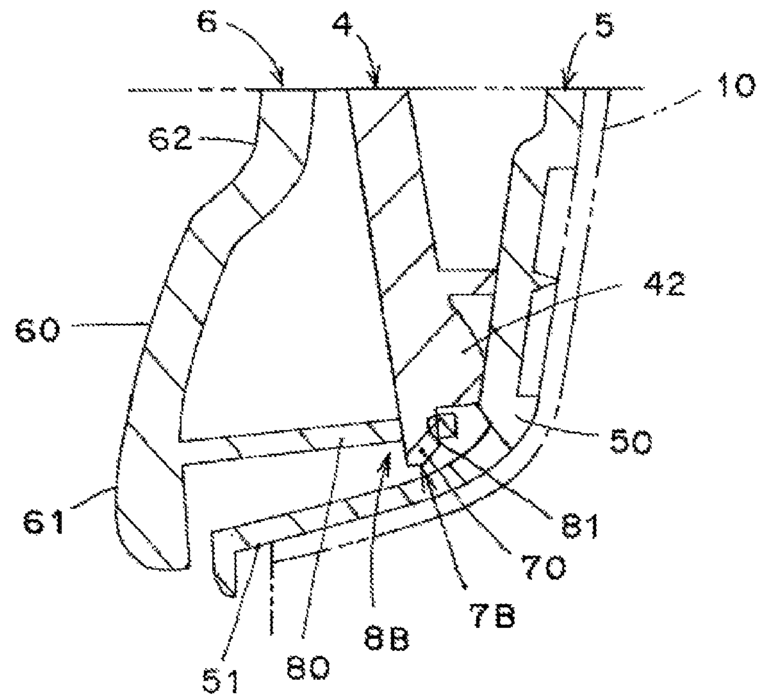
FIG. 6 is a partially enlarged cross-sectional view of the base assembly, which is an enlarged view of an encircled area VI in FIG. 4.
Figure 7:
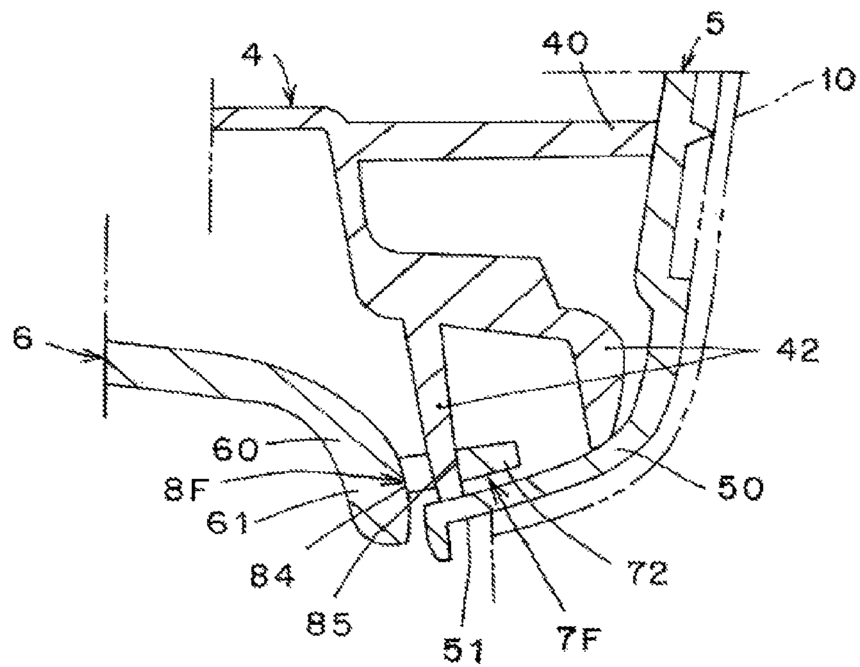
FIG. 7 is a partially enlarged cross-sectional view of the base assembly, which is an enlarged view of an encircled area VII in FIG. 5.
Figure 9:
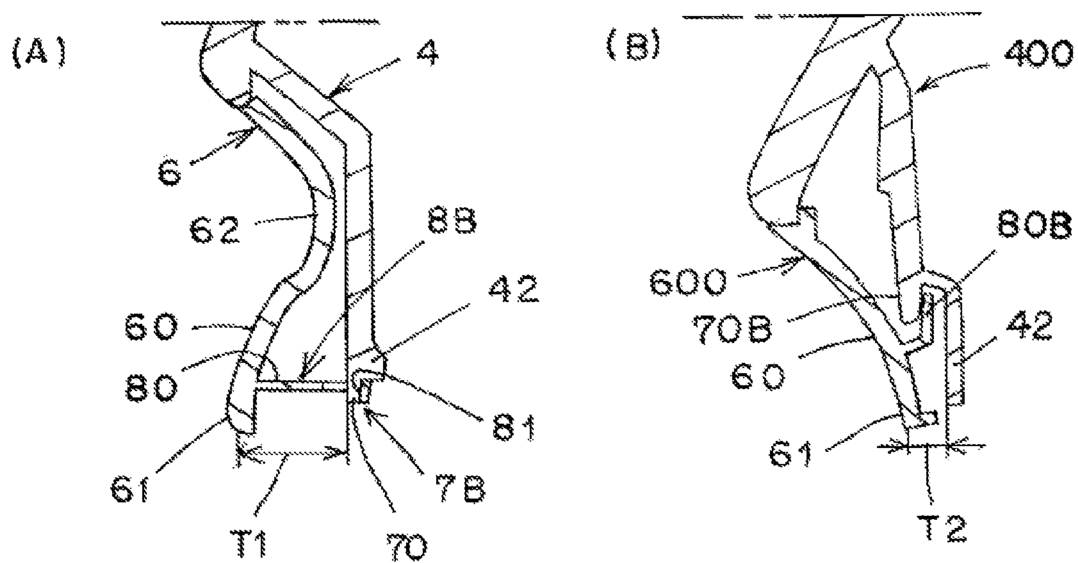
FIG. 9 shows a partially enlarged cross-sectional view illustrating a back-side stopper part of the base and a back-side stopper part of the cover, which corresponds to FIG. 6, FIG. 9 (A) shows a partially enlarged cross-sectional view illustrating an embodiment of the present invention, and FIG. 9 (B) shows a partially enlarged cross-sectional view illustrating an example without carrying out the present invention.
Figure 10:
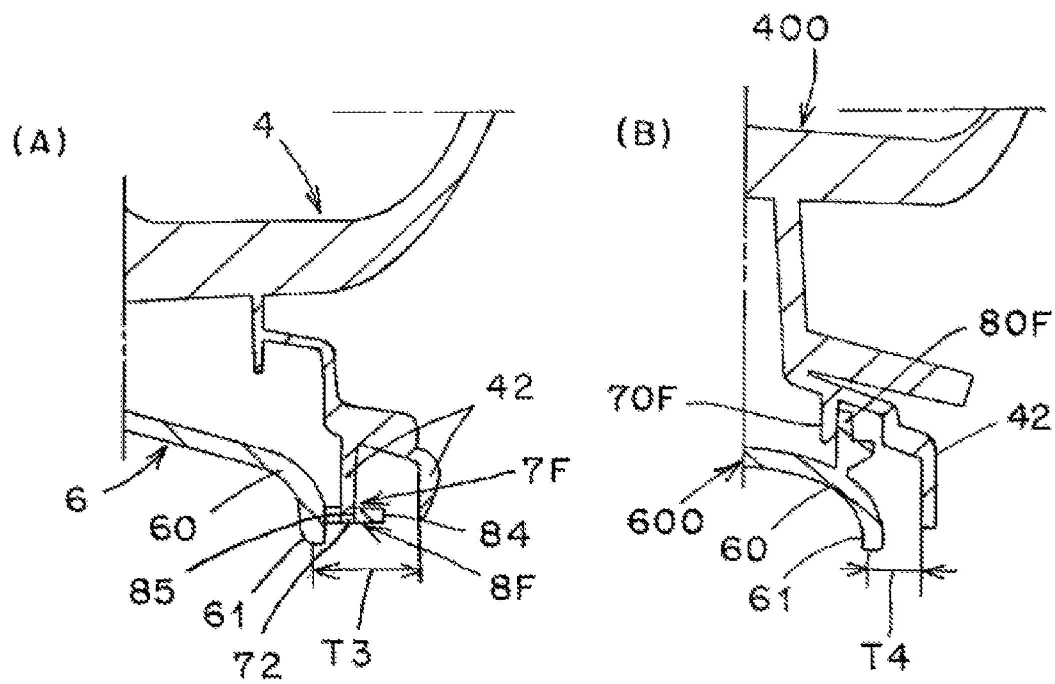
FIG. 10 shows a partially enlarged cross-sectional view illustrating a front-side stopper part of the base and a front-side stopper part of the cover, which corresponds to FIG. 7, FIG. 10 (A) shows a partially enlarged cross-sectional view illustrating an embodiment of the present invention, and FIG. 10 (B) shows a partially enlarged cross-sectional view illustrating an example without carrying out the present invention.

As shown in FIGS. 4, 6 and 9, the cover 6 is provided continuously at the vertical edge part 61 and has a concave part 62 which is concaved from the vertical edge part 61's side to the downward portion of the base 4 and to the downward portion of the gasket 5. The concave part 62 is formed at the rear side portion of the cover 6.

Description of Stopper Parts 7 and 8

As shown in FIGS. 4 through 10, stopper parts 7 and 8 are provided at the edge part 42 at the downward portion of the base 4 and the vertical edge part 61 of the cover 6, respectively. The stopper parts 7 and 8 restrict the vertical edge part 61 of the cover 6 from moving with respect to the edge part 42 at the downward portion of the base 4 by action of the horizontal edge part 51 of the gasket 5. In an event when the vertical edge part 61 of the cover 6 moves with respect to the edge part 42 at the downward portion of the base 4, the vertical edge part 61 may include the edge part 60 and the concave part 62.

The stopper part 7 at the base 4's side is provided in the vertical direction. The stopper part 8 at the cover 6's side is provided in the horizontal direction. Namely, the stopper part 7 at the base 4's side and the stopper part 8 at the cover 6's side intersect each other.

The stopper parts 7 and 8 include a back-side stopper part 7B provided on the back side portion of the base 4 and a back-side stopper part 8B provided on the back side portion of the cover 6, and a front-side stopper part 7F provided on the front side portion of the base 4 and a front-side stopper part 8F provided on the front side portion of the cover 6, respectively.

Description of Back-Side Stopper Parts 7B and 8B

The back-side stopper part 8B of the cover 6 has plate part 80, abutting edge part 81, additional plate part 82, and additional abutting edge part 83.

Figure 8:
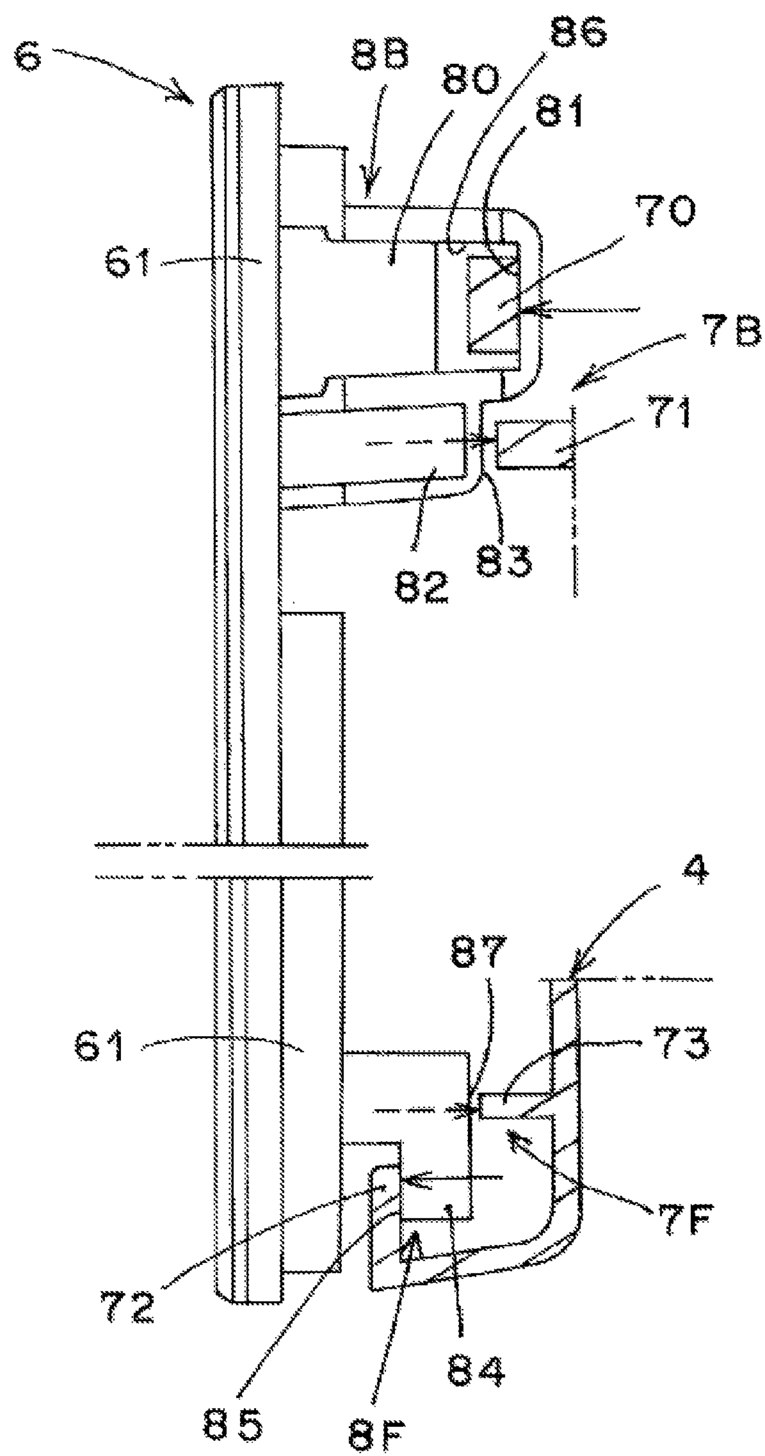
FIG. 8 is a plan view illustrating a stopper part of a base and a stopper part of a cover.

As shown in FIG. 8, the plate part 80 is integrally provided in a horizontal direction from an inside surface of the vertical edge part 61, which faces the edge part 42 of the base 4. The plate part 80 is substantially perpendicular (orthogonal) to the vertical edge part 61.

The abutting edge part 81 is provided at an edge of an opening 86 of the plate part 80. Namely, the plate part 80 has the opening 86. The abutting edge part 81 is provided at the edge opposed to the vertical edge part 61 among edges of the opening 86.

The additional plate part 82 is integrally provided to be adjacent to the plate part 80 in a horizontal direction from the inside surface of the vertical edge part 61. Similar to the plate part 80, the additional plate part 82 is substantially perpendicular (orthogonal) to the vertical edge part 61.

The plate part 80 and the additional plate part 82 are made thinner to prevent cracking during molding. On the other hand, the plate part 80 and the additional plate part 82 are made thicker at the peripheral edge portions than at the center portions to improve strength. As a result, the abutting edge part 81 can obtain sufficient strength even if a dimension in an abutting direction (solid arrow direction in FIG. 8) is reduced.

The additional abutting edge part 83 is provided at the edge opposed to the vertical edge part 61 among edges of the additional plate part 82. The additional abutting edge part 83 is provided to be adjacent to the abutting edge part 81.

The back-side stopper part 7B on the base 4's side has abutting protrusion part 70 and additional abutting protrusion part 71. The abutting protrusion part 70 is integrally provided in a vertical direction from the edge part 42 so as to correspond to the abutting edge part 81. The additional abutting protrusion part 71 is integrally provided to be adjacent to the abutting protrusion part 70 in a vertical direction from the edge part 42 so as to correspond to the additional abutting edge part 83.

The abutting edge part 81 and the abutting protrusion part 70 are in contact with each other, so that the vertical edge part 61 can be restricted from moving in a direction away from the edge part 42 (in a direction of a frontward solid arrow in FIG. 8) by action of the horizontal edge part 51. The additional abutting edge part 83 and the additional abutting protrusion part 71 are in contact with each other, so that the vertical edge part 61 can be restricted from moving in a direction close to the edge part 42 (in a direction of a frontward broken line arrow in FIG. 8).

Description of Front-Side Stopper Parts 7F and 8F

The front-side stopper part 8F on the cover 6's side has plate part 84, abutting edge part 85, and additional abutting edge part 87.

As shown in FIG. 8, the plate part 84 is integrally provided in a horizontal direction from the inside surface of the vertical edge part 61, which faces the edge part 42 of the base 4. The plate part 84 is substantially perpendicular (orthogonal) to the vertical edge part 61. The plate part 84 has a bending shape forming a right angle.

The abutting edge part 85 is provided at the edge opposed to the vertical edge part 61 among edges of the plate part 84. The additional abutting edge part 87 is provided at the edge opposed to the vertical edge part 61. The additional abutting edge part 87 is provided to be adjacent to the abutting edge part 85.

The front-side stopper part 7F on the base 4's side has abutting protrusion part 72 and additional abutting protrusion part 73. The abutting protrusion part 72 is integrally provided in a vertical direction from the edge part 42 so as to correspond to the abutting edge part 85. The additional abutting protrusion part 73 is integrally provided to be adjacent to the abutting protrusion part 72 in a vertical direction from the edge part 42 so as to correspond to the additional abutting edge part 87.

The abutting edge part 85 and the abutting protrusion part 72 are in contact with each other, so that the vertical edge part 61 can be restricted from moving in a direction away from the edge part 42 (in a direction of a backward solid arrow in FIG. 8) by action of the horizontal edge part 51. The additional abutting edge part 87 and the additional abutting protrusion part 73 are in contact with each other, so that the vertical edge part 61 can be restricted from moving in a direction close to the edge part 42 (in a direction of the backward broken line arrow in FIG. 8).

Description of Assembling Base Assembly 3 into Door Mirror 1

Assembling the base assembly 3 into the door mirror 1 is described below.

First, the cover 6 is attached to the downward portion of the fixing part 40 and the downward portion of the attaching part 41 of the base 4 by attachment means. This allows the downward portion of the fixing part 40 and the downward portion of the attaching part 41 to be covered by the cover 6.

Here, as shown in FIG. 8, the abutting protrusion part 70 is inserted into the opening 86 to bring the abutting protrusion part 70 into contact with the abutting edge part 81 each other. Furthermore, the additional abutting edge part 83 is faced to the additional abutting protrusion part 71. On the other hand, the abutting edge part 85 is abutted to the abutting protrusion part 72. Furthermore, the additional abutting edge part 87 is faced to the additional abutting protrusion part 73.

Next, the gasket 5 is attached to the fixing part 40 of the base 4 by the attaching means. This allows the base assembly 3 to be assembled.

During a handling step of the assembled base assembly 3, there is a case where the vertical edge part 61 of the cover 6 is subject to force in a direction to separate the vertical edge part 61 away from the edge part 42 of the base 4 (solid arrow direction in FIG. 8), or force in a direction to bring the vertical edge part 61 closer to the edge part 42 of the base 4 (clashed arrow direction in FIG. 8).

In this case, since the abutting edge part 81 and the abutting protrusion part 70 are abutted to each other as well as the abutting edge part 85 and the abutting protrusion part 72 are abutted to each other, even if the vertical edge part 61 of the cover 6 is subjected to the force in the direction to separate the vertical edge part 61 away from the edge part 42 of the base 4 as mentioned above, it is possible to prevent the vertical edge part 61 from separating away from the edge part 42 of the base 4 and thus being lifted or fallen.

In addition, since the additional abutting edge part 87 and the additional abutting protrusion part 73 mutually face each other as well as the additional abutting edge part 87 and the additional abutting protrusion part 73 mutually face each other, even if the vertical edge part 61 of the cover 6 is subjected to the above mentioned force in the direction to bring the vertical edge part 61 closer to the edge part 42 of the base 4, it is possible to prevent the vertical edge part 61 from getting close to the edge part 42 of the base 4 or being deformed.

Then, the monitoring assembly 2 is attached on an upstream portion of the attaching part 41 of the base 4 of the base assembly 3 whose assembly is completed, rotatably around the rotation center axis line O by the electric holding unit. This allows the door mirror 1 to be assembled.

Then, the fixing part 40 of the base 4 of the door mirror 1 is fixed to the outer panel 10 of the door of a vehicle by fixing means. Thereby, the door mirror 1 is equipped on the vehicle. At this time, as shown in FIGS. 6 and 7, the gasket 5 exists between the fixing part 40 of the base 4 and the outer panel 10.

Here, the gasket 5 is subjected to various forces during existing between the fixing part 40 of the base 4 and the outer panel 10. Thereby, the horizontal edge part 51 of the gasket 5 may be forced to press against the vertical edge part 61 of the cover 6. Accordingly, the vertical edge part 61 of the cover 6 is subjected to force in a direction to separate the vertical edge part 61 away from the edge part 42 of the base 4 (solid arrow direction in FIG. 8).

Even if the vertical edge part 61 of the cover 6 is subjected to the above mentioned force to separate, as described above, since the abutting edge part 81 and the abutting protrusion part 70 are abutted to each other as well as the abutting edge part 85 and the abutting protrusion part 72 are abutted to each other, it is possible to prevent the vertical edge part 61 from separating from the edge part 42 of the base 4 and thus being lifted or fallen.

DESCRIPTION OF EFFECT OF EMBODIMENT

The base assembly 3 and the periphery monitoring device for a vehicle 1 according to the present embodiment are configured as mentioned above. A working and effect thereof are described below.

The base assembly 3 and the periphery monitoring device for a vehicle 1 according to the present embodiment includes stopper parts 7 and 8 to restrict the vertical edge part 61 (which may include the edge part 60 and the concave part 62) from moving with respect to the edge part 42 at the downward portion of the base 4 by action of the horizontal edge part 51 of the gasket 5, wherein the stopper parts 7 and 8 are provided on the edge part 42 at the downward portion of the base 4 and the vertical edge part 61 of the cover 6, respectively. As a result, the base assembly 3 and the periphery monitoring device for a vehicle 1 according to the present embodiment can restrict the vertical edge part 61 of the cover 6 from moving with respect to the base 4. This allows the base assembly 3 and the periphery monitoring device for a vehicle 1 according to the present embodiment to prevent the vertical edge part 61 of the cover 6 from being lifted, fallen, or deformed.

The base assembly 3 and the periphery monitoring device for a vehicle 1 in this embodiment have stopper parts 7, 7B, 7F on the base 4 side in the vertical direction and stopper parts 8, 8B, 8F on the cover 6 side in the horizontal direction. Consequently, as shown in FIGS. 9(A) and 10(A), the base assembly 3 and the periphery monitoring device for a vehicle 1 according to the present embodiment can have dimensions T1 and T3 between the edge part 42 of the base 4 and the vertical edge part 61 of the cover 6 larger than dimensions T2 and T4 in the case where the present invention is not carried out (see FIGS. 9(B) and 10(B)).

This allows the base assembly 3 and the periphery monitoring device for a vehicle 1 according to the present embodiment to have increased dimensions T1 and T3 between the edge part 42 of the base 4 and the vertical edge part 61 of the cover 6, so that flexibility of design shape of the base assembly 3, flexibility of design shape of the periphery monitoring device for a vehicle 1, and flexibility of design shape of the outer panel 10 can be increased.

The case where the present invention is not carried out (hereinafter referred to as "comparative example") is explained below with reference to FIGS. 9(B) and 10(B). Among FIGS. 1 through 8, 9(A), 9(B), 10(A), and 10(B), the same reference numeral or reference symbol denotes the same component.

In the comparative example, stopper parts 70B and 70F on a base 400's side are provided in a vertical direction, and the stopper parts 80B and 80F on a cover 600's side are also provided in the vertical direction. As a result, in the comparative example, it is necessary to reduce dimensions T2 and T4 between the edge part 42 of the base 400 and the vertical edge part 61 of the cover 600 due to shaping constraint of the edge part 42 of the base 400 and the vertical edge part 61 of the cover 600 as well as molding mold constraint of the base 400 and the cover 600.

Consequently, as shown in FIGS. 9(B) and 10(B), the comparative example has dimensions T2 and T4 between the edge part 42 of the base 400 and the vertical edge part 61 of the cover 600 smaller than dimensions T1 and T3 of the base assembly 3 and the periphery monitoring device for a vehicle 1 according to the present embodiment (see FIGS. 9(A) and 10(A)).

To the contrary, as shown in FIGS. 9(A) and 10(A), in the base assembly 3 and the periphery monitoring device for a vehicle 1 according to the present embodiment, the stopper parts 7, 7B, and 7F on the base 4's side are provided in the vertical direction, as well as the stopper parts 8, 8B, and 8F on the cover 6's side are provided in the horizontal direction. As a result, in the base assembly 3 and the periphery monitoring device for a vehicle 1 according to the present embodiment, it is possible to increase dimensions T1 and T3 between the edge part 42 of the base 4 and the vertical edge part 61 of the cover 6 without shaping constraint of the edge part 42 of the base 4 and the vertical edge part 61 of the cover 6 as well as molding mold constraint of the base 4 and the cover 6.

In the base assembly 3 and the periphery monitoring device for a vehicle 1 according to the present embodiment, the cover 6 is provided continuously at the vertical edge part 61 and has a concave part 62 which is concaved from the vertical edge part 61's side to the downward portion of the base 4 and to the downward portion of the gasket 5. As a result, the base assembly 3 and the periphery monitoring device for a vehicle 1 according to the present embodiment can increase flexibility of design shape of the vertical edge part 61 of the cover 6.

Furthermore, in the base assembly 3 and the periphery monitoring device for a vehicle 1 according to the present embodiment, the concave part 62 is even formed at the vertical edge part 61 of the cover 6. Nevertheless, it is possible to restrict the vertical edge part 61 of the cover 6 from moving with respect to the base 4 by means of the stopper parts 7, 7B, and 7F provided in the vertical direction on the base 4's side and the stopper parts 8, 8B, and 8F provided in the horizontal direction on the cover 6's side.

In the base assembly 3 and the periphery monitoring device for a vehicle 1 according to the present embodiment, the stopper part 8, 8B provided on the cover 6's side includes the plate part 80 provided in a horizontal direction, and the abutting edge part 81 provided at an edge part of the opening 86 provided in the plate part 80, and the stopper part 7, 7B on the base 4's side includes the abutting protrusion part 70 provided in the vertical direction. As a result, the base assembly 3 and the periphery monitoring device for a vehicle 1 according to the present embodiment can restrict the vertical edge part 61 from moving in a direction away from the edge part 42 at the downward portion of the base 4 by action of the horizontal edge part 51 as the abutting edge part 81 and the abutting protrusion part 70 are abutted to each other.

In the base assembly 3 and the periphery monitoring device for a vehicle 1 according to the present embodiment, the stopper part 8, 8B provided on the cover 6's side includes the additional plate part 82 provided in the horizontal direction adjacent to the plate part 80, and the additional abutting edge part 83 provided at the additional plate part 82, and the stopper part 7, 7B on the base 4's side includes the additional abutting protrusion part 71 provided in the vertical direction adjacent to the abutting protrusion part 70. As a result, the base assembly 3 and the periphery monitoring device for a vehicle 1 according to the present embodiment can restrict the vertical edge part 61 from moving in a direction close to the edge part 42 at the downward portion of the base 4 as the additional abutting edge part 83 and the additional abutting protrusion part 71 are abutted to each other.

In the base assembly 3 and the periphery monitoring device for a vehicle 1 according to the present embodiment, the stopper part 8, 8F provided on the cover 6's side includes the plate part 84 provided in the horizontal direction, and the abutting edge part 85 provided in the plate part 84, and the stopper part 7, 7F on the base 4's side includes the abutting protrusion part 72 provided in the vertical direction. As a result, the base assembly 3 and the periphery monitoring device for a vehicle 1 according to the present embodiment can restrict the vertical edge part 61 from moving in a direction away from the edge part 42 at the downward portion of the base 4 by action of the horizontal edge part 51 as the abutting edge part 85 and the abutting protrusion part 72 are abutted to each other.

In the base assembly 3 and the periphery monitoring device for a vehicle 1 according to the present embodiment, the stopper part 8, 8F provided on the cover 6's side includes the additional abutting edge part 87 provided at the plate part 84 adjacent to the abutting edge part 85, and the stopper part 7, 7F on the base 4's side includes the additional abutting protrusion part 73 provided in the vertical direction adjacent to the abutting protrusion part 72. As a result, the base assembly 3 and the periphery monitoring device for a vehicle 1 according to the present embodiment can restrict the vertical edge part 61 from moving in a direction close to the edge part 42 at the downward portion of the base 4 as the additional abutting edge part 87 and the additional abutting protrusion part 73 are abutted to each other.

DESCRIPTION OF EXAMPLES OTHER THAN EMBODIMENT

The base assembly 3 and the periphery monitoring device for a vehicle 1 according to the above mentioned embodiment has the base 4 in which the back-side stopper part 7B and the front-side stopper part 7F are provided, and the cover 6 in which the back-side stopper part 8B and the front-side stopper part 8F are provided.

However, in the present invention, either the back-side stopper part 7B or the front-side stopper part 7F may be provided in the base 4, and either the back-side stopper part 8B or the front-side stopper part 8F may be provided in the cover 6.

In addition, in the present invention, either the back-side stopper part 7B or the front-side stopper part 7F may be provided two each at a back-side and a front-side of the base 4, and either the back-side stopper part 8B or the front-side stopper part 8F may be provided two each at a back-side and a front-side of the cover 6.

Furthermore, in the present invention, one set or three or more sets of stopper part 7 and stopper part 8 may be provided at the base 4 and the cover 6, respectively.

The periphery monitoring device for a vehicle 1 in the above mentioned embodiment has the monitoring assembly 2 mounted on the base assembly 3, which is attached rotatably around the rotation center axis line O electrically and manually via the electric holding unit. However, the periphery monitoring device for a vehicle according to the present invention may have the monitoring assembly 2 mounted on the base assembly 3, which is attached rotatably around the rotation center axis line O manually without via the electric holding unit. The monitoring assembly 2 may be fixed to the base assembly 3 so as not to rotate around the rotation center axis line O.

DESCRIPTION OF REFERENCE NUMERALS

1 Door mirror (periphery monitoring device for a vehicle)
10 Door (outer panel of vehicle body)
2 Monitoring assembly
20 Housing
21 Monitoring unit
3 Base assembly
4, 400 Base
40 Fixing part
41 Attaching part
42 Edge part
5 Gasket
50 Edge
51 Horizontal edge part
6, 600 Cover (base undercover)
60 Edge part
61 Vertical edge part
62 Concave part
7 Stopper part (stopper part on base 4's side)
7B, 70B Back-side stopper part (back-side stopper part on base 4's side)
70 Abutting protrusion part
71 Additional abutting protrusion part
7F, 70F Front-side stopper part (front-side stopper part on base 4's side)
72 Abutting protrusion part
73 Additional abutting protrusion part
8 Stopper part (stopper part on cover 6's side)
8B, 80B Back-side stopper part (back-side stopper part on cover 6's side)
80 Plate part
81 Abutting edge part
82 Additional plate part
83 Additional abutting edge part
86 Opening
8F, 80F Front-side stopper part (front-side stopper part on cover 6's side)
84 Plate part
85 Abutting edge part
87 Additional abutting edge part
B Back
D Down
F Front
L Left
O Rotation center axis line
R Right
T1, T2, T3, T4 Dimensions between edge part 42 and vertical edge part 61
U Up

The invention claimed is:

1. A base assembly comprising: a base; a gasket; and a cover, wherein the base includes a fixing part to be fixed to a vehicle body and an attaching part, an upward portion of the attaching part being attached to a monitoring assembly, the gasket is attached to the fixing part to exist between the fixing part and the vehicle body, the cover is attached at a downward portion of the fixing part and at a downward portion of the attaching part to cover the downward portion of the fixing part and the downward portion of the attaching part, and an edge part among edge parts of the cover that faces an edge part at the downward portion of the fixing part and an edge part at a downward portion of the gasket has a vertical edge part that is provided in a vertical direction, the edge part at the downward portion of the gasket has a horizontal edge part provided in a horizontal direction from the edge part at a downward portion of the base toward the vertical edge part's side of the gasket, a plurality of stopper parts to restrict the vertical edge part from moving with respect to the edge part at the downward portion of the base by action of the horizontal edge part are provided at the edge part at the downward portion of the base and at the vertical edge part of the cover, respectively, and the stopper part on the base's side is provided in a vertical direction, and the stopper part on the cover's side is provided in a horizontal direction.

2. The base assembly according to claim 1, wherein the cover is provided continuously at the vertical edge part and has a concave part that is concaved from the vertical edge part's side to the downward portion of the base and to the downward portion of the gasket.

3. The base assembly according to claim 1, wherein the stopper part on the cover's side has a plate part provided in a horizontal direction and an abutting edge part provided at an edge of an opening provided in the plate part, the stopper part on the base's side has an abutting protrusion part provided in a vertical direction, the abutting edge part and the abutting protrusion part are abutted to each other to restrict the vertical edge part from moving in a direction away from the edge part at the downward portion of the base by action of the horizontal edge part.

4. The base assembly according to claim 3, wherein the stopper part on the cover's side has an additional plate part provided in a horizontal direction adjacent to the plate part and an additional abutting edge part provided in the additional plate part, the stopper part on the base's side has an additional abutting protrusion part provided in a vertical direction adjacent to the abutting protrusion part, and the additional abutting edge part and the additional abutting protrusion part are abutted to each other to restrict the vertical edge part from moving in a direction close to the edge part at the downward portion of the base.

5. The base assembly according to claim 1, wherein the stopper part on the cover's side has a plate part provided in a horizontal direction and an abutting edge part provided in the plate part, the stopper part on the base's side has an abutting protrusion part provided in a vertical direction, the abutting edge part and the abutting protrusion part are abutted to each other to restrict the vertical edge part from moving in a direction away from the edge part at the downward portion of the base by action of the horizontal edge part.

6. The base assembly according to claim 5, wherein the stopper part on the cover's side has an additional abutting edge part provided in the plate part adjacent to the abutting edge part, the stopper part on the base's side has an additional abutting protrusion part provided in a vertical direction adjacent to the abutting protrusion part, and the additional abutting edge part and the additional abutting protrusion part are abutted to each other to restrict the vertical edge part from moving in a direction close to the edge part at the downward portion of the base.

7. A periphery monitoring device for a vehicle, wherein the periphery monitoring device for the vehicle comprises:

the base assembly according to claim 1 fixed to a vehicle body, and a monitoring assembly attached to the base assembly.

* * * * *